US012743271B2

(12) United States Patent
Nagano et al.

(10) Patent No.: US 12,743,271 B2
(45) Date of Patent: Sep. 22, 2026

(54) INFORMATION PROCESSING SYSTEM AND INFORMATION PROCESSING METHOD

(71) Applicant: Hitachi, Ltd., Tokyo (JP)

(72) Inventors: Takehiko Nagano, Tokyo (JP); Hidetoshi Teraoka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 153 days.

(21) Appl. No.: 18/293,928

(22) PCT Filed: Jun. 9, 2022

(86) PCT No.: PCT/JP2022/023265
§ 371 (c)(1),
(2) Date: Jan. 31, 2024

(87) PCT Pub. No.: WO2023/032399
PCT Pub. Date: Mar. 9, 2023

(65) Prior Publication Data

US 2024/0338207 A1 Oct. 10, 2024

(30) Foreign Application Priority Data

Aug. 31, 2021 (JP) ................................ 2021-141731

(51) Int. Cl.
*G06F 8/70* (2018.01)
*G06Q 50/04* (2012.01)

(52) U.S. Cl.
CPC ............... *G06F 8/70* (2013.01); *G06Q 50/04* (2013.01)

(58) Field of Classification Search
CPC ............ G06F 8/70; G06Q 50/04; Y02P 90/30
See application file for complete search history.

(56) References Cited

U.S. PATENT DOCUMENTS 11,366,658 B1 * 6/2022 Wilhelm .................. G06F 8/71
2002/0035501 A1 3/2002 Handel et al.
(Continued)

FOREIGN PATENT DOCUMENTS

CN 113034012 A 6/2021
JP 2002-359500 A 12/2002
(Continued)

OTHER PUBLICATIONS

Extended European Search Report issued on Jul. 23, 2025 for European Patent Application No. 22863987.8.
(Continued)

*Primary Examiner* — Jay A Morrison
(74) *Attorney, Agent, or Firm* — Volpe Koenig

(57) ABSTRACT

A system obtains information on parts embedded in a final product across a range of companies, comprising: a product life cycle management system, used by a manufacturing company manufacturing a final product by embedding parts operated by software, for managing information on the final product and the parts and the range of disclosure of data relating to software contracted between the manufacturing company and a company that provides the parts to the manufacturing company; and a product life cycle management system used by the providing company for managing the range of disclosure and software-related data that is data relating to the software. One product life cycle management system requests a second system to disclose the software-related data within the range of disclosure, and the second system transmits the software-related data to the product life cycle management system if the requested software-related data falls within the range of disclosure.

7 Claims, 6 Drawing Sheets

(56) References Cited

U.S. PATENT DOCUMENTS

| | | | | |
|---|---|---|---|---|
| 2004/0153868 | A1 | 8/2004 | Nonaka et al. | |
| 2006/0190362 | A1 | 8/2006 | Krystek et al. | |
| 2007/0185729 | A1 | 8/2007 | Segerman | |
| 2012/0254836 | A1* | 10/2012 | Storer | G06F 8/20 717/121 |
| 2016/0328411 | A1* | 11/2016 | Easlea | G06F 16/30 |

FOREIGN PATENT DOCUMENTS

| | | | |
|---|---|---|---|
| JP | 2018-005802 | A | 1/2018 |
| JP | 2021-111048 | A | 8/2021 |
| WO | 02/03164 | A2 | 1/2002 |
| WO | 02/13043 | A2 | 2/2002 |

OTHER PUBLICATIONS

European Office Action issued on Jun. 23, 2026 for European Patent Application No. 22863987.8.

Version control—Wikipedia, XP093407690, Aug. 21, 2021, 11 pages.

* cited by examiner

[FIG. 1]
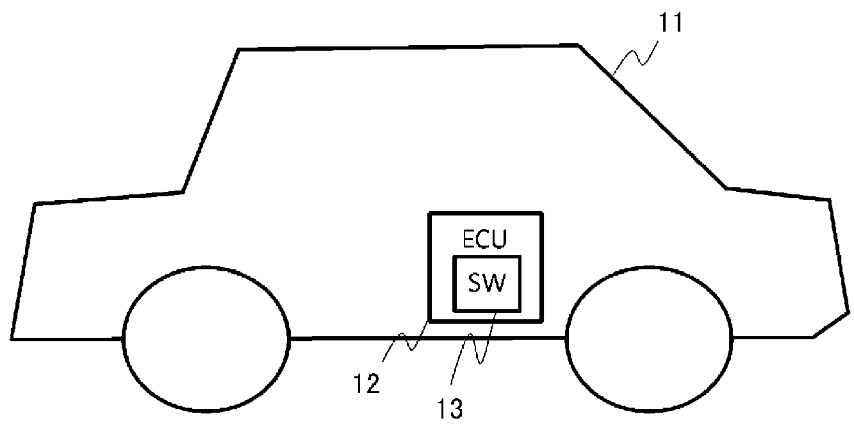
[FIG. 2]
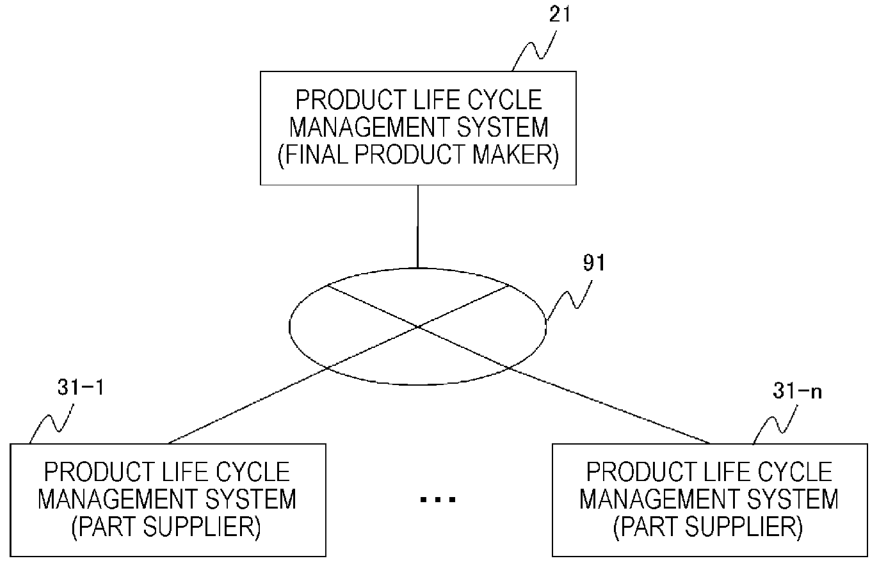

[FIG. 3]
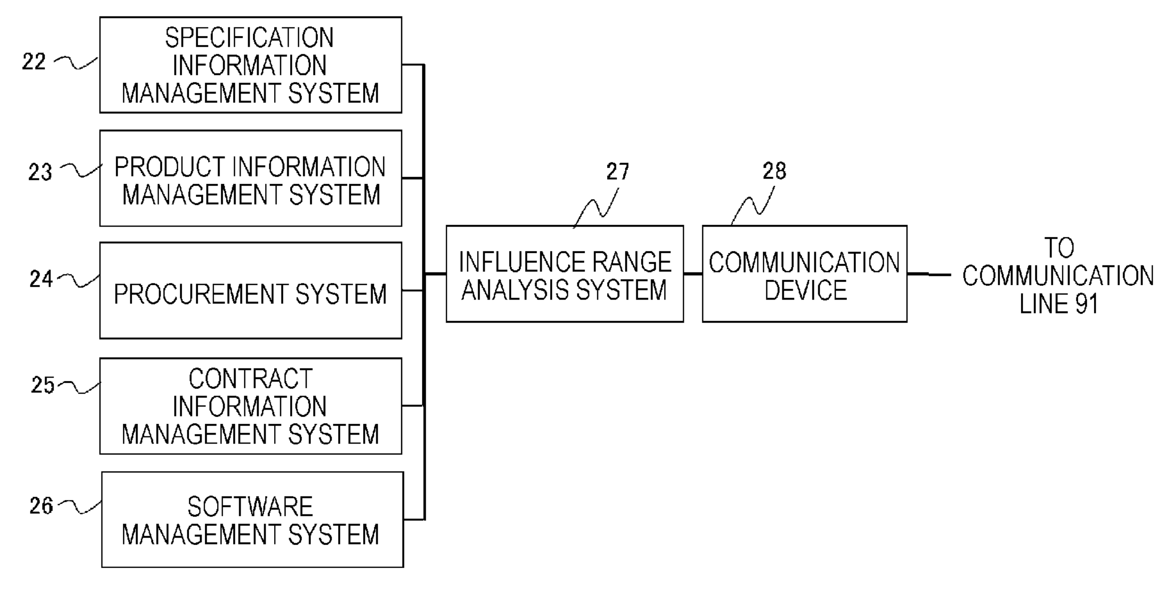
[FIG. 4]
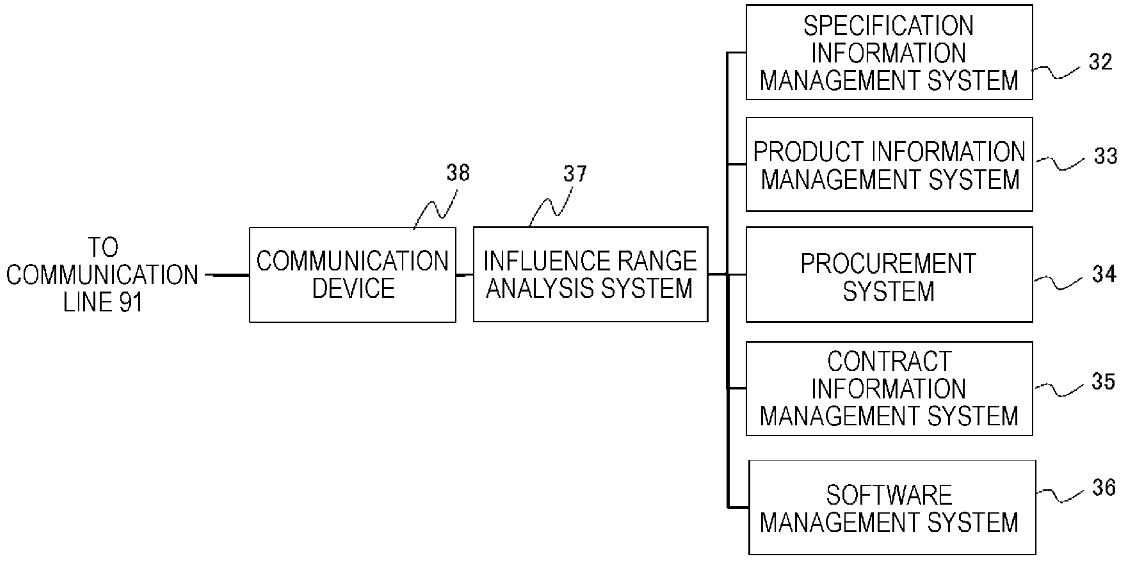

[FIG. 5]
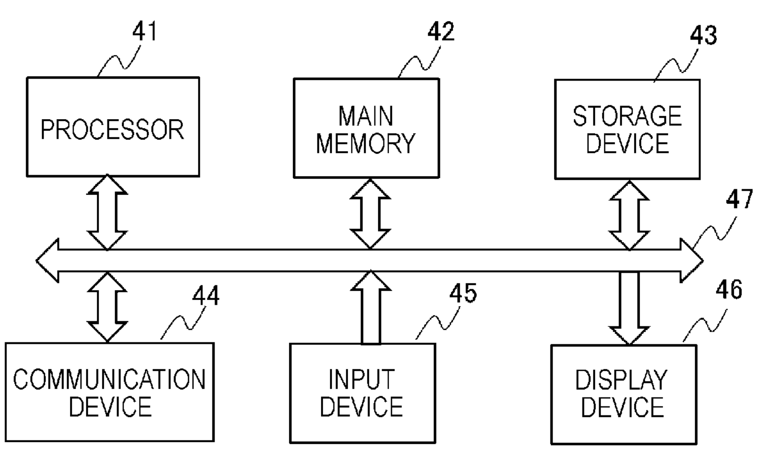

[FIG. 6]
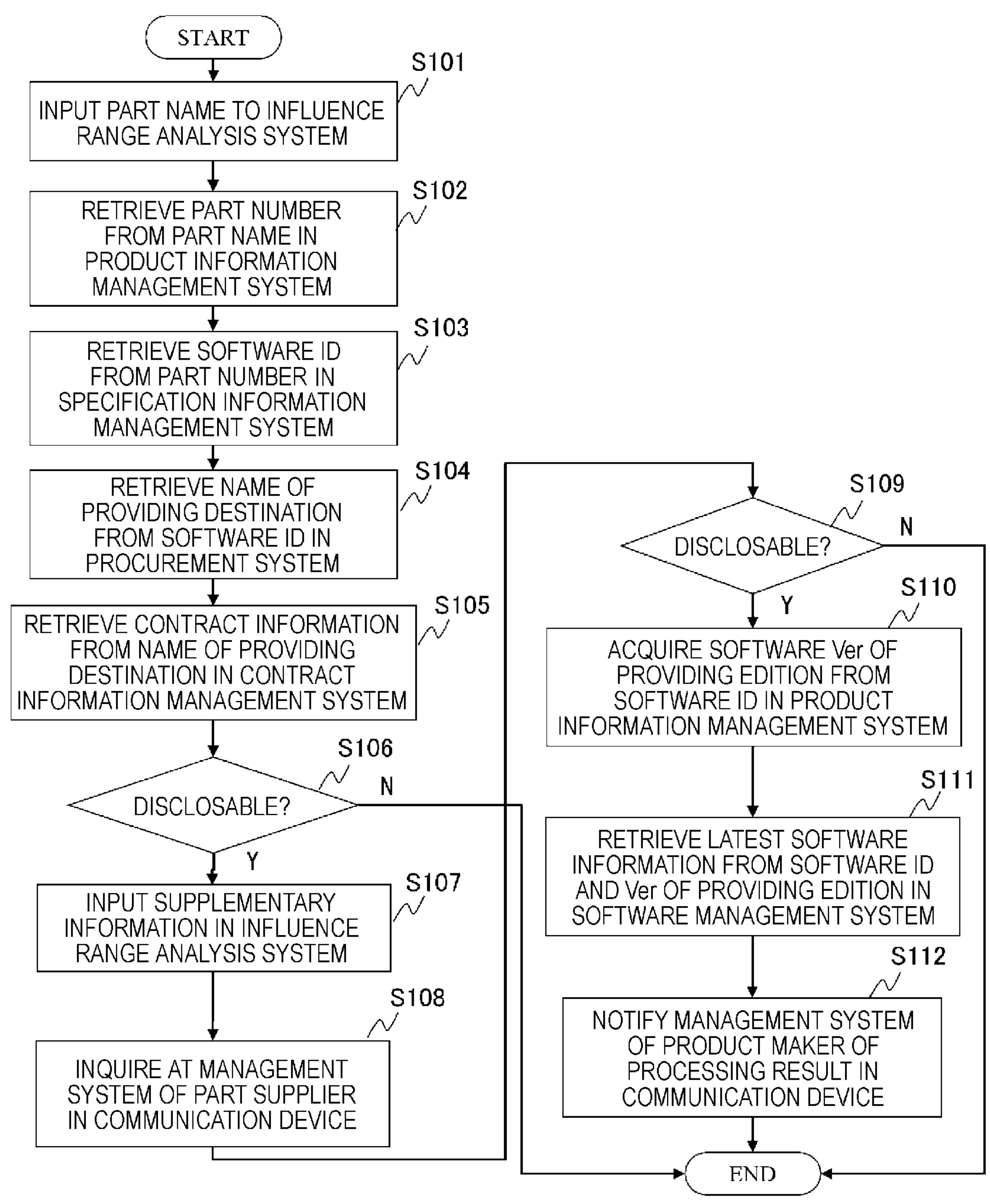

[FIG. 7]

PRODUCT INFORMATION MANAGEMENT DATA

| # | PRODUCT NAME | FUNCTION NAME | PART NAME | HARDWARE ID (PART NUMBER) |
|---|---|---|---|---|
| 1 | VEHICLE A | ENGINE CONTROL | ENGINE ECU | ECU-01 |
| 2 | | | ACCELERATOR ECU | ECU-02 |
| . | .... | .... | .... | .... |

[FIG. 8]

SPECIFICATION INFORMATION MANAGEMENT DATA

| # | SPECIFICATION ID | CLASSIFICATION | SPECIFICATION | RELATED LAW | PART NUMBER | SOFTWARE ID |
|---|---|---|---|---|---|---|
| 1 | SPC-001 | FUEL CONSUMPTION | FUEL INJECTION AMOUNT ADJUSTMENT OF ENGINE 1 | JAPANESE SAFETY STANDARD 1 | ECU-01 | E-SW-01 |
| 2 | SPC-002 | OUTPUT | IGNITION TIMING OF ENGINE 1 | JAPANESE SAFETY STANDARD 2 | ECU-02 | E-SW-02 |
| . | ... | .... | .... | ... | ... | |

[FIG. 9]

PROCUREMENT MANAGEMENT DATA

| # | PROCUREMENT ID | PROCUREMENT ITEM ID (SOFTWARE ID) | NAME OF CONTRACT DESTINATION |
|---|---|---|---|
| 1 | PROC-01 | E-SW-01 | COMPANY A |
| 2 | PROC-02 | E-SW-02 | COMPANY B |
| . | ... | .... | .... |

[FIG. 10]

CONTRACT INFORMATION MANAGEMENT DATA

| # | CONTRACT ID | NAME OF CONTRACT DESTINATION | RANGE OF DISCLOSURE |
|---|---|---|---|
| 1 | AGM-01 | COMPANY A | ENTIRELY REFERABLE |
| 2 | AGM-02 | COMPANY B | ID REFERABLE |
| . | ... | .... | .... |

[FIG. 11]

CONTRACT INFORMATION MANAGEMENT DATA

| # | CONTRACT ID | NAME OF CONTRACT DESTINATION | RANGE OF DISCLOSURE |
|---|---|---|---|
| 1 | AGM-01 | COMPANY X | ENTIRELY REFERABLE |
| 2 | AGM-11 | COMPANY Y | ID REFERABLE |
| 3 | AGM-21 | COMPANY X | SOFTWARE STRUCTURE REFERABLE |
| 4 | AGM-31 | COMPANY W | NON-REFERABLE |
| . | ... | .... | .... |

[FIG. 12]

PRODUCT INFORMATION MANAGEMENT DATA

| # | SOFTWARE ID | PROVIDING EDITION SOFTWARE Ver |
|---|---|---|
| 1 | E-SW-01 | E-SW-01_ver1.0.2 |
| 2 | E-SW-02 | E-SW-02_Ver1.11.3 |
| . | .... | .... |

[FIG. 13]

SOFTWARE MANAGEMENT DATA

| # | SOFTWARE ID | PROVIDING EDITION SOFTWARE Ver | SOURCE CODE |
|---|---|---|---|
| 1 | E-SW-01 | E-SW-01_ver1.0.3 | |
| 2 | E-SW-02 | E-SW-02_Ver2.0.1 | |
| . | .... | .... | |

INFORMATION PROCESSING SYSTEM AND INFORMATION PROCESSING METHOD

TECHNICAL FIELD

The present invention relates to a technology for managing information regarding a product in a company.

BACKGROUND ART

PTL 1 discloses a scheme of performing traceability management to manage relations between a plurality of outcomes in each process of software development. In the scheme disclosed in PTL 1, an access right is assigned for each requirement, publication or non-publication is set, and access is limited in the traceability management.

CITATION LIST

Patent Literature

PTL 1: JP2018-005802A

SUMMARY OF INVENTION

Technical Problem

In general, various parts are embedded in a product. However, such parts cannot be said to be all manufactured by a product manufacturing company that is a company manufacturing the product. The product manufacturing company may procure parts from part providing companies that are companies manufacturing the parts used for the product and manufacture a product in which the parts are embedded. The parts also include parts in which hardware and software are combined.

The scheme disclosed in PTL 1 is a scheme in a company that develops software and it is not assumed that information regarding an outcome is accessed from an external company or the like. Therefore, for example, in practice, a product manufacturing company checks a history in the own company of parts, then checks a contract condition with a part providing company, and requests the part providing company to check a history of the parts in the part providing company by a mail or the like, and the part providing company receives the request, checks a history of the parts, and notifies the product manufacturing company of the history, which is cumbersome.

An object of the present disclosure is to provide a technique capable of acquiring information regarding parts embedded in a final product across companies.

Solution to Problem

To achieve the above object, according to an aspect of the present disclosure, an information processing system includes: a first life cycle management system in a manufacturing company that manufactures a final product by embedding parts that are operated by software configured to manage information regarding the final product and the part and a range of disclosure of data relating to the software contracted with a providing company that provides the part to the manufacturing company; and a second life cycle management system in the providing company configured to manage the range of disclosure and software-related data that is data relating to the software. The first life cycle management system requests the second life cycle management system to disclose the software-related data within the range of disclosure. The second life cycle management system transmits the software-related data to the first life cycle management system when the requested software-related data falls within the range of disclosure.

Advantageous Effects of Invention

According to the present disclosure, it is possible to enable information regarding parts embedded in a final product to be acquired across companies.

BRIEF DESCRIPTION OF DRAWINGS

FIG. 1 is a diagram illustrating an example of a final product and a part in which an information processing system is used.

FIG. 2 is a diagram illustrating an embodiment of the information processing system.

FIG. 3 is a block diagram illustrating a configuration of a product life cycle management system of a final product maker illustrated in FIG. 2.

FIG. 4 is a block diagram illustrating a configuration of product life cycle management systems of part suppliers illustrated in FIG. 2.

FIG. 5 is a block diagram illustrating a hardware configuration of each system illustrated in FIGS. 3 and 4.

FIG. 6 is a flowchart illustrating an information processing method in the information processing system illustrated in FIGS. 2 and 3.

FIG. 7 is a diagram illustrating an example of product information management data managed in a product information management system illustrated in FIG. 2.

FIG. 8 is a diagram illustrating an example of specification information management data managed in a specification information management system illustrated in FIG. 2.

FIG. 9 is a diagram illustrating an example of procurement management data managed in a procurement system illustrated in FIG. 2.

FIG. 10 is a diagram illustrating an example of contract information management data managed in a contract information management system illustrated in FIG. 2.

FIG. 11 is a diagram illustrating an example of contract information management data managed in a contract information management system illustrated in FIG. 3.

FIG. 12 is a diagram illustrating an example of product information management data managed in a product information management system illustrated in FIG. 3.

FIG. 13 is a diagram illustrating an example of software management data managed in a software management system illustrated in FIG. 3.

DESCRIPTION OF EMBODIMENTS

Hereinafter, embodiments of the present invention will be described with reference to the drawings.

FIG. 1 is a diagram illustrating an example of a final product and a part to which an information processing system is applied.

For example, as illustrated in FIG. 1, the information processing system is used to manage an electronic control unit (ECU) 12 which is a part embedded in an automobile 11 which is a final product and electronically controlling the automobile 11 by software 13. Accordingly, data of software on a management system of a company providing the ECU and the software can be acquired from a management system of a company manufacturing the automobile.

FIG. 2 is a diagram illustrating an embodiment of the information processing system.

In the information processing system according to the embodiment, as illustrated in FIG. 2, a product life cycle management system 21 of a final product maker that is a manufacturing company manufacturing the automobile 11 which is a final product in which the ECU 12 which is a part operated by the software 13 is embedded as in the automobile 11 illustrated in FIG. 1 and product life cycle management systems 31-1 to 31-*n* of part suppliers which are providing companies manufacturing parts and providing the part to the final product maker as in the ECU 12 illustrated in FIG. 1 can be connected via a communication line 91 such as the Internet. The final part maker is called an OEM. It is desirable to provide the product life cycle management systems 31-1 to 31-*n* by the number of companies manufacturing parts embedded in the final product manufactured by the product life cycle management system 21, but only some of the companies that manufacture the parts embedded in the final product manufactured by the product life cycle management system 21 may be provided.

The product life cycle management system 21 (first life cycle management system) manages information regarding the final product and the parts embedded in the final product and a range of disclosure of data relating to software contracted with the part suppliers, and requests the product life cycle management systems 31-1 to 31-*n* to disclose software-related data within the range of disclosure.

The product life cycle management systems 31-1 to 31-*n* (second life cycle management system) manage a range of disclosure of data relating to software contracted with the final product maker and software-related data that is data relating to software of a part manufactured by the own company, and transmit the requested software-related data to the product life cycle management system 21 when the software-related data requested from the product life cycle management system 21 falls within the range of disclosure of the data relating to the software contracted with the final product maker.

Accordingly, it is possible to acquire information across companies in a configuration in which a manufacturing company procures parts and software from a providing company and manufactures a final product.

FIG. 3 is a block diagram illustrating a configuration of the product life cycle management system 21 illustrated in FIG. 2.

As illustrated in FIG. 3, the product life cycle management system 21 illustrated in FIG. 2 includes a specification information management system 22, a product information management system 23, a procurement system 24, a contract information management system 25, a software management system 26, an influence range analysis system 27, and a communication device 28.

The specification information management system 22 manages specification information data management in which part identification information indicating a part embedded in the final product is associated with software identification information indicating software operating on the part for each specification relating to the final product with regard to the specification.

The product information management system 23 (first product information management unit) manages first product information management data in which final product identification information indicating a final product and part identification information indicating part names of the parts embedded in the final product and the parts are associated.

The procurement system 24 manages procurement management data in which software identification information and providing company information for identifying a providing company of software are associated.

The contract information management system 25 (first contract information management unit) manages first contract information management data indicating a contract disclosure level indicating a range of disclosure relating to software contracted with each of the providing companies that have the product life cycle management systems 31-1 to 31-*n*.

The software management system 26 manages information regarding software developed by the own company or simple management information of the externally procured software.

The influence range analysis system 27 is configured to be able to access the first product information management data managed in the product information management system 23, the specification information management data managed in the specification information management system 22, the procurement management data managed in the procurement system 24, and the first contract information management data managed in the contract information management system 25. When a part name is designated, the influence range analysis system 27 accesses the first product information management data and acquires the part identification information corresponding to the designated part name, subsequently accesses the specification information management data acquires the software identification information corresponding to the acquired part identification information, subsequently accesses the procurement management data and acquires the providing company information associated with the acquired software identification information, subsequently accesses the contract information management data and acquires the contract disclosure level of the part supplier indicated by the acquired providing company information, and subsequently transmits a request for disclosing the software-related data within the range of disclosure of the acquired contract disclosure level to the product life cycle management system of the part supplier via the communication device 28. The influence range analysis system 27 displays the designated part name and the software-related data transmitted from the product life cycle management systems 31-1 to 31-*n*.

FIG. 4 is a block diagram illustrating a configuration of the product life cycle management systems 31-1 to 31-*n* illustrated in FIG. 2.

As illustrated in FIG. 4, the product life cycle management systems 31-1 to 31-*n* illustrated in FIG. 2 include a specification information management system 32, a product information management system 33, a procurement system 34, a contract information management system 35, a software management system 36, an influence range analysis system 37, and a communication device 38.

The specification information management system 32 manages specification data relating to detailed specifications of the parts manufactured by the own company.

The product information management system 33 (second product information management unit) manages second product information management data in which software identification information of software is associated with version information of the provided software.

The procurement system 34 manages procurement data relating to the parts manufactured by the own company.

The contract information management system 35 (second contract information management unit) manages second contract information management data indicating a contract disclosure level indicating a range of disclosure relating to the software contracted with the final product maker that has the product life cycle management system 21.

The software management system 36 manages software management data in which the software identification information, version information indicating a version, and software-related data of a level disclosable in the software are associated for each software and each version.

The influence range analysis system 37 (second influence range analysis unit) is configured to be able to access the second contract information management data managed in the contract information management system 35 and the software-related data managed in the software management system 36. The influence range analysis system 37 accesses the second contract information management data when a request transmitted from the product life cycle management system 21 is received via the communication device 38, acquires the version information of the provided software from the second product information management data when the software-related data requested in the received request falls within the range of disclosure of the final product maker corresponding to the product life cycle management system 21 of a transmission source of the request, acquires the software-related data relating to the software from the software management data, and transmits the software-related data to the product life cycle management system 21 of the final product maker via the communication device 38.

FIG. 5 is a block diagram illustrating a hardware configuration of each system illustrated in FIGS. 3 and 4.

In the hardware configuration of each system illustrated in FIGS. 3 and 4, as illustrated in FIG. 5, a processor 41, a main memory 42, a storage device 43, a communication device 44, an input device 45, and a display device 46 are connected to each other via a bus 47.

The processor 41 implements each function illustrated in FIGS. 3 and 4 by executing a software program read from the storage device 43 to the main memory 42.

The communication device 44 makes connection to another device.

The input device 45 inputs information to various tables set in the storage device 43.

The display device 46 displays and outputs an execution result by the processor 41.

Hereinafter, an information processing method in the information processing system that have the above configuration will be described.

FIG. 6 is a flowchart illustrating an information processing method in the information processing system illustrated in FIGS. 2 and 3.

When a malfunction occurs in a part embedded in the final product manufactured by the final product maker that has the product life cycle management system 21 and a part name of the part in which the malfunction occurs is input to the influence range analysis system 27 of the product life cycle management system 21 (step S101), the influence range analysis system 27 first accesses the product information management data managed in the product information management system 23, and retrieves and acquires a part number serving as part identification information of the part from the product information management data using the input part name (step S102).

FIG. 7 is a diagram illustrating an example of the product information management data managed in the product information management system 23 illustrated in FIG. 2.

The product information management system 23 illustrated in FIG. 2 manages the product information management data in which final product identification information indicating the final product, a function name indicating a product name and the function of the final product, the part name of the part embedded in the final product, and the part number are associated for each final product, as illustrated in FIG. 7. Therefore, the influence range analysis system 27 can retrieve and acquire the part number serving as part identification information of the part from the product information management data using the input part name by accessing the product information management data managed in the product information management system 23.

Subsequently, the influence range analysis system 27 accesses the specification information management data managed in the specification information management system 22, and retrieves and acquires a software ID serving as software identification information corresponding to the part number from the specification information management data using the part number acquired in step S102 (step S103).

FIG. 8 is a diagram illustrating an example of the specification information management data managed in the specification information management system 22 illustrated in FIG. 2.

The specification information management system 22 illustrated in FIG. 2 manages the specification information management data to which a specification ID indicating a specification is assigned for each specification relating the final product and in which classification, specification contents, a related law indicating a law to be observed, the part number, and software ID serving as software identification information indicating software operating on the part are associated with the specification ID, as illustrated in FIG. 8. Therefore, the influence range analysis system 27 can retrieve and acquire the software ID corresponding to the part number from the specification information management data using the part number acquired in step S102.

Subsequently, the influence range analysis system 27 accesses the procurement management data managed in the procurement system 24, and retrieves and acquires a name of a contract destination serving as providing company information corresponding to the software ID from the procurement management data using the software ID acquired in step S103 (step S104).

FIG. 9 is a diagram illustrating an example of the procurement management data managed in the procurement system 24 illustrated in FIG. 2.

The procurement system 24 illustrated in FIG. 2 manages the procurement management data to which a procurement ID for specifying part procurement is assigned for each part to be procured and in which a software ID serving as a procurement item ID and a name of a contract destination serving as a procurement destination of the part are associated with the procurement ID, as illustrated in FIG. 9. Therefore, the influence range analysis system 27 can retrieve and acquire a name of the providing company corresponding to the software ID from the procurement management data using the software ID acquired in step S103.

Subsequently, the influence range analysis system 27 accesses the contract information management data managed in the contract information management system 25, retrieves the contract information corresponding to a company name from the contract information management data using the name of the contract destination acquired in step S104, and acquires the contract disclosure level included in the contract information (step S105).

FIG. 10 is a diagram illustrating an example of the contract information management data managed in the contract information management system 25 illustrated in FIG. 2.

The contract information management system 25 illustrated in FIG. 2 manages the contract information management data to which a contract ID for specifying a contract is assigned for each contract and in which a name of a contract destination and a disclosable range serving as a contract disclosure level for the contract destination are associated with the contract ID, as illustrated in FIG. 10. Therefore, the influence range analysis system 27 can retrieve and acquire the disclosable range serving as the contract disclosure level corresponding to the name of the contract destination from the contract information management data using the name of the contract destination acquired in step S104.

When software of the part of the part name input in step S101 is disclosable within the disclosable range acquired in step S105 (step S106), the influence range analysis system 27 inputs other necessary information as supplementary information when needed (step S107), and subsequently transmits a request for disclosing the software-related data within the range of disclosure of the contract disclosure level acquired in step S105 via the communication device 28 to the product life cycle management system (for example, the product life cycle management system 31-1) of the part supplier manufacturing the part (step S108).

When the product life cycle management system 31-1 receives the request transmitted from the product life cycle management system 21 in step S108, the influence range analysis system 37 of the product life cycle management system 31-1 first accesses the contract information management data managed in the contract information management system 35, and determines whether the requested software-related data falls within the disclosable range with regard to the final product maker transmitting the request for disclosing the software-related data (step S109).

FIG. 11 is a diagram illustrating an example of the contract information management data managed in the contract information management system 35 illustrated in FIG. 3.

The contract information management system 35 illustrated in FIG. 3 manages the contract information management data to which a contract ID for specifying a contract is assigned for each contract and in which a name of a contract destination and a disclosable range serving as the contract disclosure level for the contract destination are associated with the contract ID, as illustrated in FIG. 11. Therefore, the influence range analysis system 37 can determine whether the requested software-related data falls within the disclosable range with regard to the company transmitting the request for disclosing the software-related data in step S108.

When the requested software-related data falls within the disclosable range with regard to the company transmitting the request for disclosing the software-related data in step S108, the influence range analysis system 37 accesses the product information management data managed in the product information management system 33 and acquires the version information of the provided software from the product information management data (step S110).

FIG. 12 is a diagram illustrating an example of the product information management data managed in the product information management system 33 illustrated in FIG. 3.

The product information management system 33 illustrated in FIG. 3 manages the product information management data to which a software ID for specifying software is assigned with regard to the software provided to the final product maker and in which version information of the software presently provided to the final product maker is associated with the software ID, as illustrated in FIG. 12. In the product information management data, a name of a contract destination providing the software may be associated with the software ID. Accordingly, the influence range analysis system 37 can acquire the version information of the software presently provided to the company transmitting the request for disclosing the software-related data in step S108 from the product information management data.

Subsequently, the influence range analysis system 37 accesses the software management data managed in the software management system 36, and retrieves and acquires the software-related data of the software from the software management data using the software ID and the version information acquired in step S110 (step S111).

FIG. 13 is a diagram illustrating an example of the software management data managed in the software management system 36 illustrated in FIG. 3.

The software management system 36 illustrated in FIG. 3 manages the software management data to which a software ID for specifying software is assigned with regard to the software provided to the final product maker and in which version information of the software presently provided to the final product maker and a source code which is software-related data are associated with the software ID, as illustrated in FIG. 13. Therefore, the influence range analysis system 37 can retrieve and acquire the software-related data of the software from the software management data using the version information of the software acquired in step S110. It is considered that the software-related data includes not only the source code of the software but also at least one of the source code of the software and internal structure information. Here, when the range of disclosure in the contract includes a range in which both the source code and the internal structure information are disclosable, a range in which the source code is not disclosable and the internal structure information is disclosable, and both the source code and the internal structure information are not disclosable, it can be determined whether the source code and the internal structure information of the software can be disclosed by the contract and flexible disclosure of data according to the contract between the companies can be implemented.

Thereafter, the influence range analysis system 37 transmits the software-related data acquired from the software management data in step S111 to the product life cycle management system of the final product maker via the communication device 38 (step S112).

When the influence range analysis system 27 receives the software-related data transmitted from the influence range analysis system 37 of the product life cycle management system 31 via the communication device 28 of the product life cycle management system 21, the influence range analysis system 27 displays the part name input in step S101 and the software-related data transmitted from the product life cycle management system 31-1.

Through the above-described series of processes, the final product maker can request the software-related data of the part embedded in the final product to the part supplier and acquire the software-related data.

The product life cycle management systems 31-1 to **31-*n* of the part suppliers store the software-related data for each version of the software in the software management system 36. Thus, by transmitting the software-related data for the software of the version provided to the final product maker to the product life cycle management system 21** of the final product maker, the final product maker can easily obtain data relating to the software of the version applied to the part embedded in the final product.

In both the product life cycle management systems 21 and 31, data relating to a contract including the range of disclosure is managed. Thus, the product life cycle management system 21 checks whether the software-related data is disclosable based on the contracts with the part suppliers that have the product life cycle management systems 31-1 to 31-*n*. When the software-related data is disclosable, the product life cycle management system 21 requests the software-related data to the product life cycle management systems 31-1 to 31-*n*, and the product life cycle management systems 31-1 to 31-*n* receive the request from the product life cycle management system 21 and check whether the software-related data is disclosable based on the contracts with the final product maker that has the product life cycle management systems 31-1 to 31-*n*. When the software-related data is disclosable, the product life cycle management systems 31-1 to 31-*n* transmits the software-related data to the product life cycle management system 21. Accordingly, as the manufacturing company and the providing companies both manage the range of disclosure by the contracts and both check the contracts in the disclosure of the software-related data, it is possible to reliably disclose the software-related data in the contracted range.

As described above, the specification information management system 22 of the product life cycle management system 21 of the final product maker further manages related law information indicating a law to be observed with regard to the specification of the part in the managed specification information management data. Therefore, the influence range analysis system 27 may be configured to access the specification information management data and further acquire the related law information corresponding to the part identification information, and to display the acquired related law information along with the part name input in step S101 and the software-related data transmitted from the part suppliers. Accordingly, information regarding a related law can be displayed along with the software-related data acquired across companies from the providing companies.

As described above, in the product information management data managed in the product information management system 23, a function name indicating a function of a final product is associated with a part number of a part embedded in the final product. Therefore, it is also conceivable that, when the function name is designated, the influence range analysis system 27 of the product life cycle management system 21 of the final product maker accesses the product information management data managed in the product information management system 23, acquires part identification information of a part corresponding to the designated function name, acquires software identification information corresponding to the acquired part identification information, acquires providing company information indicating a company providing software indicated by the acquired software identification information, acquires a contract disclosure level of the providing company indicated by the acquired providing company information, and transmits a request for disclosing data relating to the software within the range of disclosure of the acquired contract disclosure level to the product life cycle management systems 31-1 to 31-*n* of the part suppliers indicted by the providing company information. Here, it is possible to obtain the advantage of specifying an influence range from the function name and acquiring information regarding software of a related part.

The above-described embodiments are exemplified to describe the present invention and the scope of the present invention is not limited to only the embodiments. Those skilled in the art can embody the present invention in various aspects without departing from the scope of the present invention.

REFERENCE SIGNS LIST

11: automobile
12: ECU
13: software
21: product life cycle management system (final product maker)
22, 32: specification information management system
23, 33: product information management system
24, 34: procurement system
25, 35: contract information management system
26, 36: software management system
27, 37: influence range analysis system
28, 38: communication device
31: product life cycle management system (part supplier)
41: processor
42: main memory
43: storage device
44: communication device
45: input device
46: display device
47: bus
91: communication line

The invention claimed is:

1. An information processing system comprising:

a first life cycle management system in a manufacturing company that manufactures a final product by embedding one or more parts that are operated by software configured to manage information regarding the final product and the one or more parts and a first disclosure range of first software-related data contracted with a providing company that provides the one or more parts to the manufacturing company, wherein the first life cycle management system comprises;

a first product information management unit that manages first product information management data in which final product identification information indicating the final product is associated with part identification information indicating a part name of the part embedded in the final product and the one or more parts, a specification information management unit that manages specification information management data in which the part identification information is associated with software identification information indicating software operating on the one or more parts for each specification relating to the final product with regard to the specification, a procurement management unit that manages procurement management data in which the software identification information is associated with providing company information for identifying a providing company of the software, a first contract information management unit that stores and manages first contract information management data indicating a contract disclosure level identifying the first disclosure range of the first software-related data, and a first influence range analysis unit that is capable of accessing the first product information management data, the specification information management data, the procurement management data, and the first contract information management data; and a second life cycle management system in the providing company configured to manage a second disclosure range of second software-related data contracted with the manufacturing company, wherein the second life cycle management system comprises:

a second product information management unit that manages second product information management data in which software identification information of the software is associated with version information of the provided software, a software management unit that manages software management data in which the software identification information, version information indicating a version, and the second software-related data of a level disclosable of the software are associated, for each software and each version, a second contract information management unit that stores and manages second contract information management data indicating a contract disclosure level identifying the second disclosure range of the second software-related data, and a second influence range analysis unit that is capable of accessing the second contract information management data, the second product information management data, and the software management data, wherein, when a part name is designated, the first influence range analysis unit accesses the first product information management data and acquires part identification information corresponding to the part name, accesses the specification information management data and acquires software identification information corresponding to the acquired part identification information, accesses the procurement management data and acquires providing company information associated with the acquired software identification information, accesses the first contract information management data and acquires contract disclosure level of a providing company indicated by the acquired providing company information, checks whether requested data is disclosable based on the first contract information management data, and transmits a request for disclosing data within a disclosure range of the acquired contract disclosure level to the second life cycle management system of the providing company, and wherein the second influence range analysis unit receives the request, accesses the second contract information management data, checks whether the requested data is disclosable based on the second contract information management data, acquires version information of the provided software from the second product information management data when the requested data falls within the second disclosure range, retrieves the second software-related data from the software management data using the software identification information and the acquired version information, and transmits the second software-related data to the first life cycle management system.

2. The information processing system according to claim 1, wherein the first or second software-related data includes at least one of a source code and internal structure information of the software, and the first or second disclosure range comprise a range in which both the source code and the internal structure information are disclosable, a range in which the source code is not disclosable and the internal structure information is disclosable, and a range in which both the source code and the internal structure information are not disclosable.

3. The information processing system according to claim 1, wherein the first life cycle management system manages a life cycle including manufacturing and operating of the final product, the second life cycle management system manages a life cycle including developing, providing, and operating of the one or more parts and the software, and the first influence range analysis unit displays the designated part name and the second software-related data transmitted from the second influence range analysis unit.

4. The information processing system according to claim 3, wherein the specification information management unit further manages related law information indicating a law to be observed with regard to the specification in the specification information management data, and the first influence range analysis unit accesses the specification information management data, further acquires related law information corresponding to the part identification information, and displays the acquired related law information along with the designated part name and the first software-related data.

5. The information processing system according to claim 3, wherein the final product is an automobile and the part is an electronic control unit (ECU).

6. The information processing system according to claim 3, wherein the first product information management unit further associates a function name indicating a function of the final product relating to the one or more parts in the first product information management data, and the first influence range analysis unit accesses the first product information management data when the function name is designated and acquires part identification information of a part corresponding to the function name, acquires software identification information corresponding to the acquired part identification information, acquires providing company information indicating a company providing software indicated by the acquired software identification information, acquires a contract disclosure level of a providing company indicated by the acquired providing company information, and transmits a request for disclosing data relating to the software within the range of disclosure of the acquired contract disclosure level to the second life cycle management system of the providing company indicated by the acquired providing company information.

7. An information processing method comprising:

managing, by a first life cycle management system that is an information processing unit of a manufacturing company that manufactures a final product by embedding one or more parts that are operated by software, information regarding the final product and the one or more parts and a first disclosure range of first software-related data contracted with a providing company that provides the one or more parts to the manufacturing company, wherein the first life cycle management system comprises a first product information management unit that manages first product information management data in which final product identification information indicating the final product is associated with part identification information indicating a part name of the part embedded in the final product and the one or more parts, a specification information management unit that manages specification information management data in which the part identification information is associated with software identification information indicating software operating on the one or more parts, a procurement management unit that manages procurement management data in which the software identification information is associated with providing company information for identifying a providing company of the software, a first contract information management unit that stores and manages first contract information management data indicating a contract disclosure level identifying the first disclosure range of the first software-related data, and a first influence range analysis unit;

managing, by a second life cycle management system which is an information processing system of the providing company, a second disclosure range of second software-related data contracted with the manufacturing company, wherein the second life cycle management system comprises a second product information management unit that manages second product information management data in which software identification information of the software is associated with version information of the provided software, a software management unit that manages software management data in which the software identification information, version information indicating a version, and the second software-related data of a level disclosable of the software are associated for each software and each version, a second contract information management unit that stores and manages second contract information management data indicating a contract disclosure level identifying the second disclosure range of the second software-related data, and a second influence range analysis unit;

when a part name is designated, accessing, by the first influence range analysis unit, the first product information management data and acquiring part identification information corresponding to the part name, accessing the specification information management data and acquiring software identification information corresponding to the acquired part identification information, accessing the procurement management data and acquiring providing company information associated with the acquired software identification information, accessing the first contract information management data and acquiring contract disclosure level of a providing company indicated by the acquired providing company information, checking whether requested data is disclosable based on the first contract information management data, and transmitting a request for disclosing data within a disclosure range of the acquired contract disclosure level to the second life cycle management system of the providing company; and receiving, by the second influence range analysis unit, the request, accessing the second contract information management data, checking whether the requested data is disclosable based on the second contract information management data, acquiring version information of the provided software from the second product information management data when the requested data falls within the second disclosure range, retrieving the second software-related data from the software management data using the software identification information and the acquired version information, and transmitting the second software-related data to the first life cycle management system.

* * * * *